United States Patent
Buford et al.

(10) Patent No.: US 9,211,790 B2
(45) Date of Patent: Dec. 15, 2015

(54) RECHARGEABLE ENERGY STORAGE SYSTEM COOLING

(75) Inventors: Keith D. Buford, Southfield, MI (US); Matthew Simonini, Greenville, SC (US); Roland Matthe, Bischofsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 782 days.

(21) Appl. No.: 13/566,675

(22) Filed: Aug. 3, 2012

(65) Prior Publication Data

US 2014/0034288 A1    Feb. 6, 2014

(51) Int. Cl.
*H01M 10/50* (2006.01)
*B60K 11/00* (2006.01)
*H01M 10/66* (2014.01)
*H01M 10/42* (2006.01)
*H01M 10/613* (2014.01)

(52) U.S. Cl.
CPC ............... *B60K 11/00* (2013.01); *H01M 10/42* (2013.01); *H01M 10/613* (2015.04); *H01M 10/66* (2015.04)

(58) Field of Classification Search
CPC ..... B60K 11/02; B60K 11/06; H01M 10/613; H01M 10/625; H01M 10/63; H01M 10/633; H01M 10/637; H01M 2220/20
USPC .................. 429/62, 71, 72, 120, 148, 149
See application file for complete search history.

(56) References Cited

U.S. PATENT DOCUMENTS

| 2011/0079023 A1 | 4/2011 | Goenka et al. |
| 2011/0139397 A1* | 6/2011 | Haussmann ............. 165/43 |

FOREIGN PATENT DOCUMENTS

CN        102442219 A      5/2012

OTHER PUBLICATIONS

State Intellectual Property Office of the People'S Republic of China, Office Action for Chinese Patent Application No. 201310333403.3 mailed Aug. 3, 2015.

* cited by examiner

*Primary Examiner* — Patrick Ryan
*Assistant Examiner* — Ben Lewis
(74) *Attorney, Agent, or Firm* — Ingrassia Fisher & Lorenz, P.C.

(57) ABSTRACT

Methods, systems, and vehicles are provided that provide for cooling of a vehicle rechargeable energy storage system (RESS). A cooling system is coupled to the RESS, and is configured to cool the RESS. A control system is coupled to the cooling system, and is configured to determine whether the RESS is charging, determine whether the vehicle is in a propulsion ready state, and initiate cooling of the RESS if the RESS is not charging and the vehicle is not in the propulsion ready state, provided further that one or more conditions are present that would promote faster than desired capacity loss for the RESS.

20 Claims, 4 Drawing Sheets

RECHARGEABLE ENERGY STORAGE SYSTEM COOLING

TECHNICAL FIELD

The present disclosure generally relates to the field of vehicles and, more specifically, to methods and systems for cooling of rechargeable energy storage systems of vehicles.

BACKGROUND

Certain vehicles, particularly electric vehicles and hybrid electric vehicles, have rechargeable energy storage systems (RESS), such as batteries. It is generally desired to maintain a temperature of the RESS within certain limits. The RESS temperature may be maintained by continuously monitoring the voltage and current values associated with the RESS, and by cooling the RESS when the RESS temperature approaches an upper or lower RESS temperature limit. However, this type of RESS cooling may not always be optimal, for example if there is limited life remaining in the RESS.

Accordingly, it is desirable to provide improved methods for cooling of vehicle RESS, for example when there is limited life remaining in the RESS. It is also desirable to provide improved systems for such cooling of vehicle RESS, and for vehicles that include such methods and systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for cooling a rechargeable energy storage system (RESS) of a vehicle. The method comprises the steps of determining whether the RESS is charging, determining whether the vehicle is in a propulsion ready state, and initiating cooling of the RESS if the RESS is not charging and the vehicle is not in the propulsion ready state, provided further that one or more conditions are present that would promote faster than desired capacity loss for the RESS.

In accordance with another exemplary embodiment, a control system is provided for cooling a rechargeable energy storage system (RESS) of a vehicle. The control system comprises a cooling system and a controller. The cooling system is configured to cool the RESS. The controller is coupled to the cooling system, and is configured to determine whether the RESS is charging, determine whether the vehicle is in a propulsion ready state, and initiate cooling of the RESS if the RESS is not charging and the vehicle is not in the propulsion ready state, provided further that one or more conditions are present that would promote faster than desired capacity loss for the RESS.

In accordance with a further exemplary embodiment, a vehicle is provided. The vehicle comprises a drive system, a cooling system, and a control system. The drive system includes a rechargeable energy storage system (RESS). The cooling system is coupled to the RESS, and is configured to cool the RESS. The control system is coupled to the cooling system, and is configured to determine whether the RESS is charging, determine whether the vehicle is in a propulsion ready state, and initiate cooling of the RESS if the RESS is not charging and the vehicle is not in the propulsion ready state, provided further that one or more conditions are present that would promote faster than desired capacity loss for the RESS.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
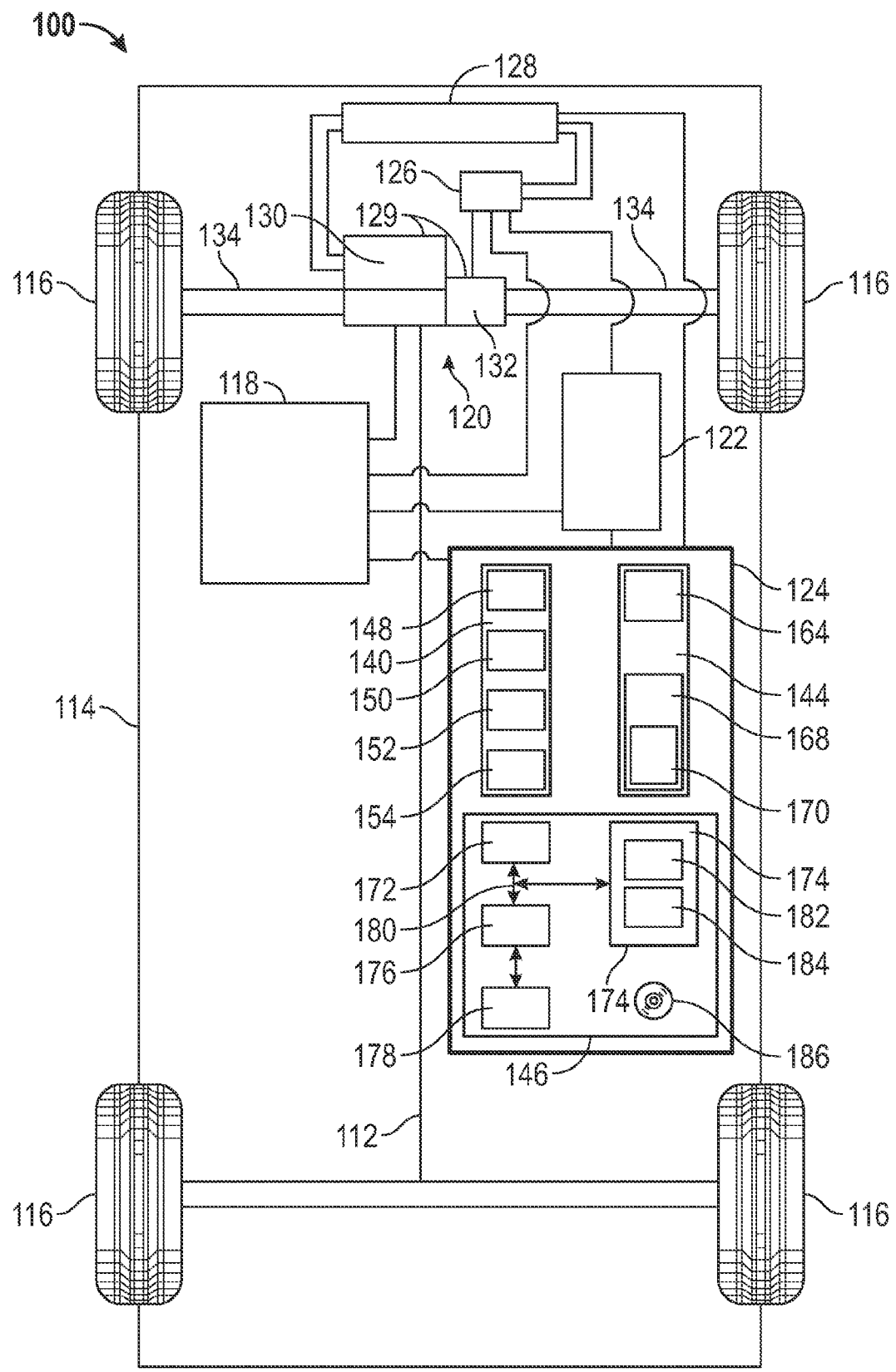
FIG. 1 is a functional block diagram of a vehicle that includes a rechargeable energy storage system (RESS) and a control system for cooling the RESS, in accordance with an exemplary embodiment.

FIG. 1 illustrates a vehicle 100, or automobile, according to an exemplary embodiment. As described in greater detail further below, the vehicle 100 is configured to cool a rechargeable energy storage system (RESS) of the vehicle 100 under certain conditions in which the vehicle 100 is not charging and is not in a propulsion ready state.

The vehicle 100 includes a chassis 112, a body 114, four wheels 116, and an electronic control system 118. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 120, the above-referenced RESS 122, an RESS control system 124, a power inverter assembly (or inverter) 126, and a radiator 128. The actuator assembly 120 includes at least one propulsion system 129 mounted on the chassis 112 that drives the wheels 116.

Specifically, as depicted in FIG. 1, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130. In certain other embodiments, the vehicle 100 may comprise a pure electric vehicle, without a combustion engine 130.

The RESS 122 is electrically connected to the inverter 126. In one embodiment, the RESS 122 is mounted on the chassis 112. In one such embodiment, the RESS 122 is disposed within a cockpit of the vehicle. In another embodiment, the RESS 122 is disposed underneath a cockpit of the vehicle. The RESS 122 preferably comprises a rechargeable battery having a pack of battery cells. In one embodiment, the RESS 122 comprises a lithium iron phosphate battery, such as a nanophosphate lithium ion battery. Together the RESS 122 and the propulsion system 129 provide a drive system to propel the vehicle 100. The RESS 122 is cooled by the RESS control system 124, as described in detail below.

As depicted in FIG. 1, the RESS control system 124 includes a sensor array 140, a cooling system 144, and one or more controllers 146. The RESS control system 124 is coupled to, and at least facilitates control over, the RESS 122. Also as depicted in FIG. 1, the RESS control system 124 is preferably coupled to the radiator 128. In addition, although not illustrated as such, the RESS control system 124 (and/or one or more components thereof) may be integral with the electronic control system 118 and may also include one or more power sources. In certain embodiments, the controller(s) 146 may comprise multiple controllers and/or systems working together. For the sake of brevity, such controllers and/or systems are referenced collectively herein as the controller 146.

The sensor array 140 includes one or more connection state sensors 148, propulsion state sensors 150, RESS temperature sensors 152, and additional RESS sensors 154. The connection state sensors 148 detect whether the vehicle 100 is plugged into an electrical outlet, such as a 120/240 alternating current (AC) or a direct current (DC) fast charging outlet. The propulsion state sensors 150 detect a measure of whether the vehicle 100 is in a propulsion capable state (for example, by detecting a current driving mode or gear of the vehicle 100). The RESS temperature sensors 152 each measure a temperature of the RESS 122, most preferably each measuring a temperature of a different cell of the RESS 122. The additional RESS sensors 154 measure data pertaining to the RESS that is used in determining a state of charge of the RESS 122. In certain embodiments, the additional RESS sensors 154 include current sensors and/or voltage sensors that measure current and/or voltage, respectively, of the RESS. The various sensors of the sensor array 140 provide signals or other information regarding the measured values to the controller 146 for controlling cooling of the RESS 122 in accordance with steps of the process of FIG. 4 described further below.

The cooling system 144 includes a pump 164 and a liquid-to-liquid heat exchanger 168 that includes an alternating current (AC) compressor 170. While the cooling system 144 is operating (based on instructions provided by the controller 146 in accordance with the steps of the process of FIG. 4, descried further below), coolant fluid is circulated by the pump 164 to the heat exchanger 168 (specifically, including the compressor 170 thereof), thereby producing cooled coolant fluid that is used to cool the RESS 122. The cooling system 144 is initiated and controlled via instructions provided by the controller 146, preferably by a processor 172 thereof.

As depicted in FIG. 1, the controller 146 comprises a computer system. In certain embodiments, the controller 146 may also include one or more of the sensors of the sensor array 140, the electronic control system 118 and/or portions thereof, and/or one or more other devices. In addition, it will be appreciated that the controller 146 may otherwise differ from the embodiment depicted in FIG. 1. For example, the controller 146 may be coupled to or may otherwise utilize one or more remote computer systems and/or other control systems.

In the depicted embodiment, the computer system of the controller 146 comprises a computer system that includes a processor 172, a memory 174, an interface 176, a storage device 178, and a bus 180. The processor 172 performs the computation and control functions of the controller 146, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 146 and the computer system of the controller 146, preferably in executing the steps of the processes described herein, such as the steps of the process 400 described further below in connection with FIG. 4.

The memory 174 can be any type of suitable memory. This would include the various types of dynamic random access memory (DRAM) such as SDRAM, the various types of static RAM (SRAM), and the various types of non-volatile memory (PROM, EPROM, and flash). The bus 180 serves to transmit programs, data, status and other information or signals between the various components of the computer system of the controller 146. In a preferred embodiment, the memory 174 stores the above-referenced program 182 along with one or more stored values 184 for use in cooling of the RESS 122. In certain examples, the memory 174 is located on and/or co-located on the same computer chip as the processor 172.

The interface 176 allows communication to the computer system of the controller 146, for example from a system driver and/or another computer system, and can be implemented using any suitable method and apparatus. It can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 400 of FIG. 4, described further below. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium storing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 146 may also otherwise differ from the embodiment depicted in FIG. 1, for example in that the computer system of the controller 146 may be coupled to or may otherwise utilize one or more remote computer systems and/or other control systems.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the combustion engine 130 and the inverter 126.

Figure 2:
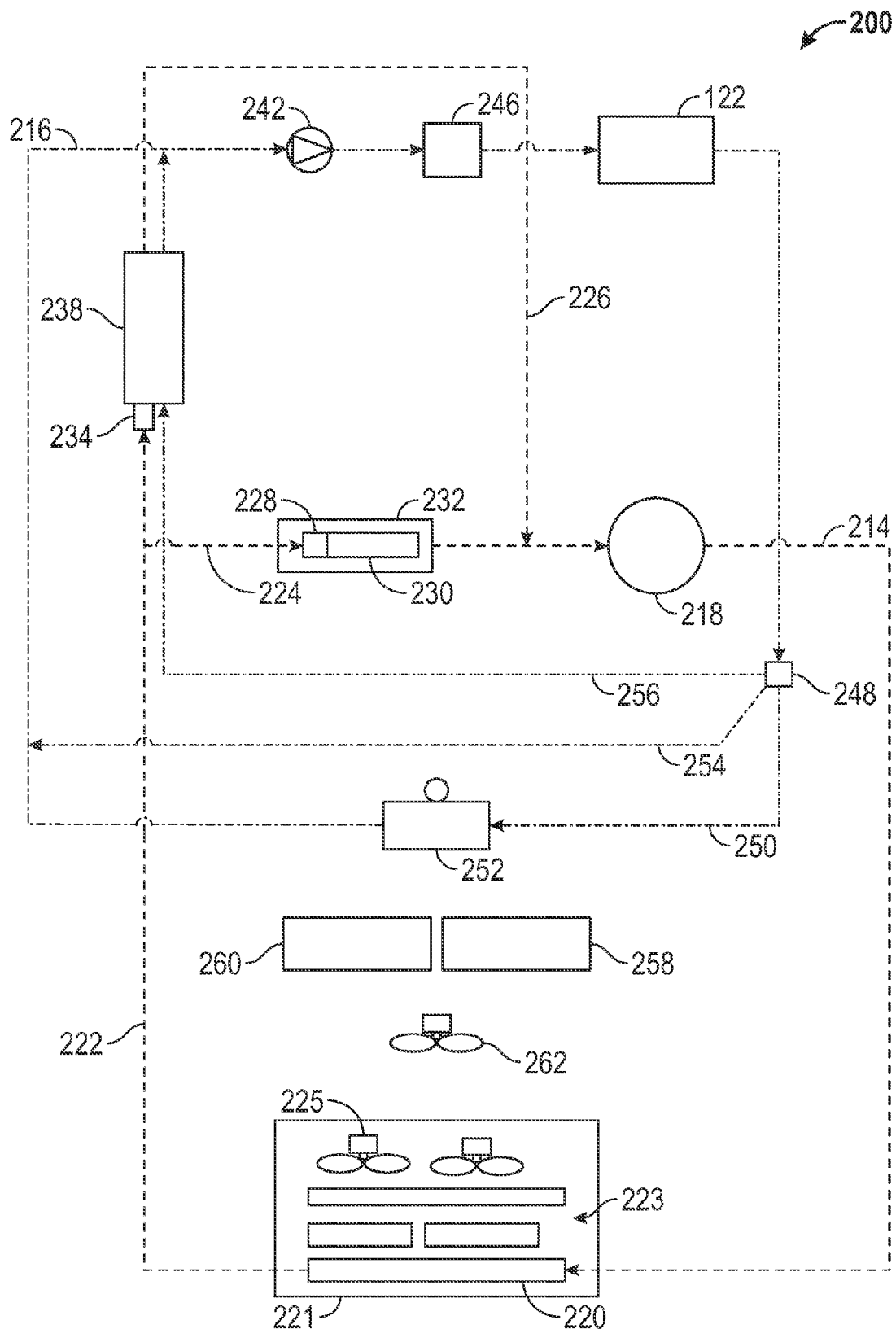
FIG. 2 is a schematic view of a cooling system of the control system of FIG. 1, in accordance with an exemplary embodiment.

With reference to FIG. 2, a schematic view is provided of a cooling system 200 for use in cooling an RESS of a vehicle, such as the RESS 122 of the vehicle 100 of FIG. 1, in accordance with a first exemplary embodiment. The cooling system 200 preferably corresponds to the cooling system 144 of FIG. 1, in accordance with a preferred embodiment. The embodiment of the cooling system 200 depicted in FIG. 2 may be used, for example, in a plug-in hybrid electric vehicle or an extended range electric vehicle. Each of the components of the cooling system 200 are preferably controlled directly or indirectly via instructions provided by the controller 146 of FIG. 1, most preferably by the processor 172 thereof.

As depicted in FIG. 2, the cooling system 200 includes a refrigerant loop 214 and a coolant loop 216, both preferably corresponding to the cooling system 144 of FIG. 1. The refrigerant loop 214 includes a refrigerant compressor 218 (preferably corresponding to the compressor 170 of FIG. 1) and a condenser 220. In certain examples, the refrigerant loop 214 and the refrigerant compressor 218 may be part of a condenser, radiator, fan module (CRFM) 221. The CRFM 221 may include other heat exchangers 223 and fans 225 used to heat or cool fluids from other vehicle systems as well as from the RESS 122 of FIG. 1. In a preferred embodiment, the refrigerant compressor 218 is electrically driven, and is capable of adjusting the speed of the compressor during operation.

The condenser 220 directs refrigerant into a refrigerant line 222 that splits into a heat, ventilation, and air cooling (HVAC) leg 224 and a chiller leg 226 of the refrigerant loop 214. The HVAC leg 224 directs the refrigerant through an expansion device 228 and into an evaporator 230, which is located in an HVAC module 232. In some embodiments, refrigerant exiting the evaporator 230 may be directed back to the refrigerant compressor 218 through an accumulator (not shown).

The chiller leg 226 directs the refrigerant through an expansion device 234 and then through a chiller 238. The chiller 238 preferably comprises a refrigerant-to-coolant heat exchanger. Refrigerant exiting the chiller 238 is directed back to the refrigerant compressor 218 via chiller leg 226.

The chiller 238 is also in fluid communication with the coolant loop 216. The dashed lines in FIG. 2 (and, similarly, in FIG. 3, described further below) represent lines through which refrigerant flows. The dash-dot lines represent lines through which a coolant liquid flows. The coolant liquid may be a conventional liquid mixture such as an ethylene glycol and water mix, or may be some other type of liquid with suitable heat transfer characteristics.

As depicted in FIG. 2, the coolant loop 216 includes a coolant pump 242 (preferably, corresponding to the pump 164 of FIG. 1) that pumps the coolant through the coolant loop 216. The coolant pump 242 is controllable to vary the flow rate of the coolant flowing through the coolant loop 216. The coolant loop 216 also includes the RESS 122 of FIG. 1, and an electric coolant heater 246. The coolant flowing through the RESS 122 is used to cool or warm the RESS as needed. The electric coolant heater 246 can be activated to heat the coolant flowing through it in order to provide warming to the RESS 122.

A four port coolant routing valve 248 is located in the coolant loop 216. The routing valve 248 can be selectively actuated to direct the coolant through three different branches of the coolant loop 216. A first branch 250 includes an RESS radiator 252 (preferably, corresponding to the radiator 128 of FIG. 1), which is positioned to have air flowing through it. The RESS radiator 252 may be mounted near an accessory power module 258 and an RESS charger 260, which have air directed through them by a controllable fan 262. A second branch 254 forms a coolant bypass line where the coolant does not flow through the RESS radiator 252 or the chiller 238. A third branch 256 directs the coolant through the chiller 238. All three branches join together to direct the coolant back through the RESS 122.

Figure 3:
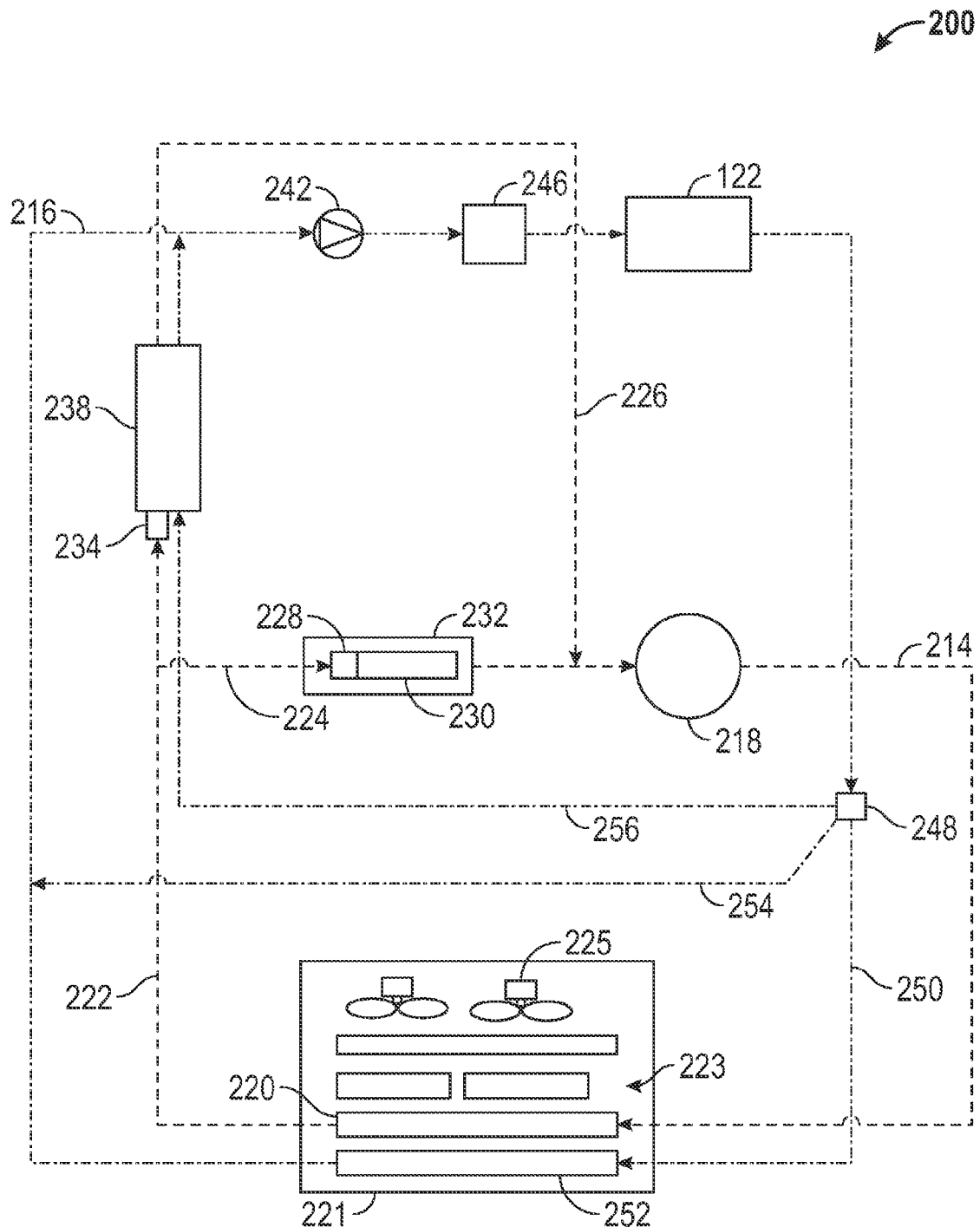
FIG. 3 is a schematic view of a cooling system of the control system of FIG. 1, in accordance with an alternate exemplary embodiment.

FIG. 3 illustrates another example of the cooling system 200, in accordance with a second exemplary embodiment. The embodiment of FIG. 3 may be used, for example, in connection with an extended range electric vehicle. Because the embodiment of FIG. 3 is similar to that of FIG. 2, similar element numbers will be used for similar elements, which also have similar functions as those described above in connection with FIG. 2. In the embodiment of FIG. 3, the RESS radiator 252 may be part of the CRFM 221. While the two embodiments of FIGS. 2 and 3 may have somewhat different configurations, the processes, discussed below, for cooling and warming the RESS 122 may be essentially the same, if so desired. Similar to the embodiment of FIG. 2, in FIG. 3 each of the components of the cooling system 200 are similarly preferably controlled directly or indirectly via instructions provided by the controller 146 of FIG. 1, most preferably by the processor 172 thereof.

Figure 4:
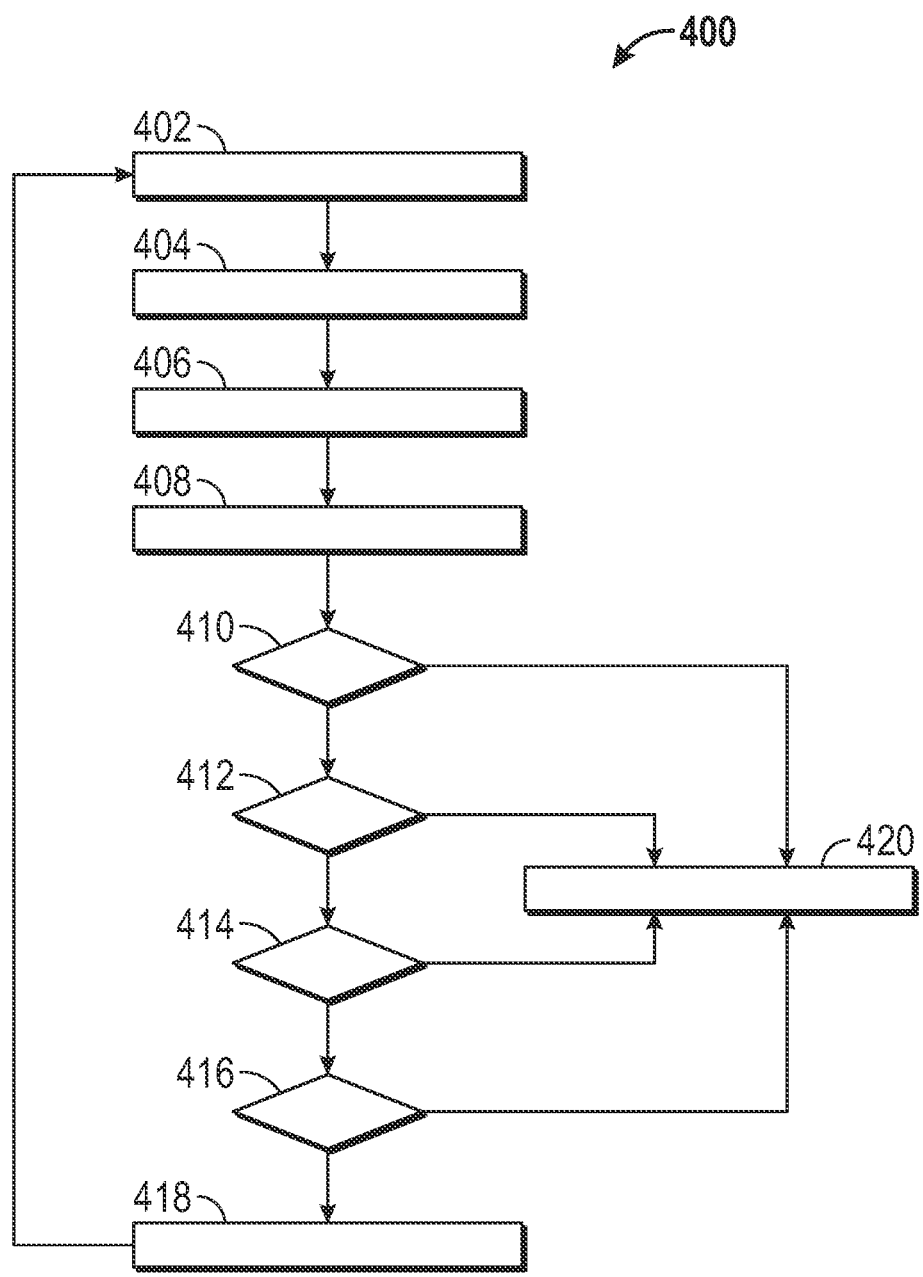
FIG. 4 is a flowchart of a process for cooling an RESS for a vehicle, and that can be used in connection with the vehicle, the RESS, and the control system of FIG. 1 (including the cooling systems of FIGS. 2 and 3), in accordance with an exemplary embodiment.

FIG. 4 is a flowchart of a process 400 for cooling an RESS for a vehicle, in accordance with an exemplary embodiment. The process 400 cools a rechargeable energy storage system (RESS) of a vehicle when the vehicle is not charging and is not in a propulsion ready state, provided that other conditions are also satisfied. The process 400 can be utilized in connection with the vehicle 100, the RESS 122, and the RESS control system 124 of FIG. 1, including the cooling system 144 (and including the combined implementation of the cooling system 200 embodiments of FIGS. 2 and 2). Each of the steps of the process 400 is preferably performed repeatedly, and preferably continuously, throughout a current vehicle drive (or current ignition cycle of the vehicle).

A charging status of the vehicle is assessed (step 402). Preferably, the assessment of step 402 includes information as to whether the vehicle is plugged into a charging outlet. This assessment is preferably made by the processor 172 of FIG. 1 based on the detected values from the connection sensors 148 of FIG. 1.

A propulsion state of the vehicle is assessed (404). This assessment is preferably made by the processor 172 of FIG. 1 based on the detected values from the propulsion state sensors 150 of FIG. 1. Preferably, the assessment of step 404 includes information pertaining to whether the vehicle is currently in a gear or mode in which propulsion of the vehicle may imminently occur.

RESS temperatures are obtained (step 406). Preferably, the RESS temperatures are obtained from various cells of the RESS 122 of FIG. 1 by the RESS temperature sensors 152 of FIG. 1 and provided to the controller 146 of FIG. 1, and most preferably to the processor 172 thereof, which calculates an average cell temperature for the RESS 122 by averaging the various cell temperature values. As used throughout this application, the RESS temperature preferably comprises a temperature within the RESS 122 of FIG. 1, and most preferably an average RESS temperature value, such as described directly above.

A state of charge of the RESS is determined (step 408). Preferably, the RESS state of charge is estimated by the processor 172 of FIG. 1 based on RESS. The RESS inputs preferably include the RESS temperature of step 406 as well as RESS current and/or voltage values measured by the additional RESS sensors 154 of FIG. 1. In one such embodiment, the RESS state of charge is estimated based on RESS current values from step 412 using techniques known in the art, for example by integrating the RESS current over time. In another such embodiment, the RESS state of charge is estimated based on RESS voltage values using techniques known in the art, for example using a known discharge curve of voltage versus state of charge for the RESS. In one embodiment, the RESS state of charge is determined using a Kalman filter; however, this may vary in other embodiments. In certain embodiments, the state of charge may be estimated using techniques described in commonly assigned U.S. patent application Ser. Nos. 12/238,204 (entitled "Method and System for Determining a State of Charge of a Battery", filed Sep. 25, 2008), Ser. No. 12/238,224 (entitled "Method and System for Determining a State of Charge of a Battery Based on a Transient Response", filed Sep. 25, 2008), and/or Ser. No. 11/947,466 (entitled "Method and System for Determining a State of Charge of a Battery", filed Nov. 29, 2007), each of these three applications incorporated herein by reference. However, in other embodiments, any number of other techniques may be utilized in estimating the state of charge.

A determination is made as to whether the vehicle is charging (step 410). In one embodiment, this comprises a determination as to whether the vehicle is plugged into a 120/240 alternating current (AC) outlet or any fast charging direct current (DC) outlet. This determination is preferably made by the processor 172 of FIG. 1 based on the charging status of step 402. Preferably, if the vehicle is plugged into such an outlet, the vehicle is considered to be charging.

If it is determined that the vehicle is not charging, then a determination is also made as to whether the vehicle is in a propulsion ready state (step 412). This determination is preferably made by the processor 172 of FIG. 1 based on the information and/or determination of step 404. Preferably, the determination of step 412 comprises a determination as to whether the vehicle is currently in a gear or mode in which propulsion of the vehicle may imminently occur. In one such embodiment, the vehicle is determined to be in a propulsion ready state if the ignition or vehicle is turned "on" in a driving mode. In one embodiment, the vehicle is determined to be in a propulsion ready state if the ignition or vehicle has been turned "on" by a driver via any one of a number of different mechanisms, such as vehicle remote start, traditional key crank, and/or one or more other mechanisms (which may include a passive entry/passive start system), regardless of whether the vehicle's gear is in "reverse", "drive", "park", or the like.

If it is determined that the vehicle is not in a propulsion ready state, then a determination is also made as to whether the RESS temperature is greater than a predetermined temperature threshold (step 414). This determination is preferably made by the processor 172 of FIG. 1 based on the information and/or determination of step 406. Preferably, the determination of step 414 comprises a determination as to whether the average cell temperature of the RESS is greater than the predetermined threshold. The predetermined threshold of step 414 is preferably stored as one of the stored values 184 of the memory 174 of FIG. 1. In one exemplary embodiment, the predetermined threshold of step 414 is equal to forty degrees Celsius during a first iteration of step 414 (i.e., before any cooling of the RESS has begun); however, this may vary in other embodiments.

If it is determined that the RESS temperature is greater than the predetermined threshold of step 414, then a determination is made as to whether the RESS state of charge is greater than a predetermined state of charge threshold (step 416). This determination is preferably made by the processor 172 of FIG. 1 based on the RESS state of charge calculated in step 406 above. The predetermined threshold of step 416 is preferably stored as one of the stored values 184 of the memory 174 of FIG. 1. In one exemplary embodiment, the predetermined threshold of step 416 is equal to fifty percent of the maximum state of charge of the RESS; however, this may vary in other embodiments.

Cooling of the RESS is performed (step 418) if all of the following conditions are satisfied; namely, (i) the vehicle is not charging (as determined in step 410), (ii) the vehicle is not in a propulsion ready state (as determined in step 412), (iii) the RESS temperature is greater than the predetermined temperature threshold (as determined in step 414), and (iv) the RESS state of charge is greater than the predetermined state of charge threshold (as determined in step 416). Alternatively stated, cooling of the RESS is performed if the vehicle is not charging and the vehicle is not in a propulsion ready state, provided further that conditions are present that would promote faster than desired capacity loss for the RESS (i.e., in the depicted embodiment, that the RESS temperature is greater than the predetermined temperature threshold and the RESS state of charge is greater than the predetermined state of charge threshold). During step 418, the RESS is cooled by the RESS control system 124 of FIG. 1. Specifically, the controller 146 of FIG. 1 (most preferably the processor 172 thereof) provides signals to the cooling system 144 of FIG. 1 (including the embodiments of the cooling system 200 of FIGS. 2 and 3) to cool the RESS 122 of FIG. 1, for example by initiating use of the liquid to liquid heat exchanger 168 and the compressor 170 of FIG. 1 based on instructions provided by the processor 172 of FIG. 1. The RESS is preferably cooled in accordance with a cooling strategy (such as turning a compressor and/or heat exchanger off and on, adjusting a fan speed, a pump speed, a flow rate for a coolant fluid, a measure of heat exchanger operation, and/or one or more other actions described above in connection with the cooling systems 144, 200 of FIGS. 1-3, and/or one or more other actions that may affect the heating or cooling provided by the cooling systems 144, 200 that are designed to cause the temperature inside the RESS to decrease to a desired level.

Conversely, cooling of the RESS is not performed (step 420) if any of the above-listed criteria are not satisfied. Specifically, in accordance with step 420, the RESS cooling is not performed if any of the following is true: (i) the vehicle is charging, (ii) the vehicle is in a propulsion ready state, (iii) the RESS temperature is less than or equal to the predetermined temperature threshold, or (iv) the RESS state of charge is less than or equal to the predetermined state of charge threshold.

Returning to step 418, as the RESS cooling is performed, steps 402-418 repeat, preferably continuously, to ensure that appropriate conditions remain in place to continue the RESS cooling. In one preferred embodiment, during such iterations of step 414 in which the RESS is being cooled, a new (or second) temperature threshold is used in such subsequent iterations of step 414, with the new (or second) temperature threshold being less than the original (or first) temperature threshold of the first iteration of step 414. In one exemplary embodiment, the original (or first) predetermined temperature threshold of step 414 is equal to forty degrees Celsius, and the new (or second) temperature threshold of subsequent iterations of step 414 is reduced to thirty two degrees Celsius. In this exemplary embodiment, the determination of whether to initiate cooling of the RESS (i.e., in the first iteration) is based in part on a first RESS temperature threshold of forty degrees Celsius, while determinations in subsequent iterations as to whether to continue RESS cooling after the RESS cooling has already been are based in part on a second RESS temperature threshold of thirty two degrees Celsius. The actual values of these first and second temperature thresholds may vary in different embodiments. The state of charge threshold of step 416 preferably remains unchanged.

Accordingly, once the RESS cooling has begun in step 418, the RESS cooling continues through subsequent iterations of step 418, provided that all of the following conditions are satisfied; namely, (i) the vehicle is not charging (as determined in a subsequent iteration of step 410), (ii) the vehicle is not in a propulsion ready state (as determined in a subsequent iteration of step 412), (iii) the RESS temperature is greater than a second predetermined temperature threshold (as determined in a new iteration of step 414, preferably using a new temperature threshold that is less than the original temperature threshold of the first iteration), and (iv) the RESS state of charge is greater than the predetermined state of charge threshold (as determined in a new iteration of step 416, preferably using the same state of charge threshold as the first iteration). The cooling of the RESS terminates (step 420) once any of the following conditions is satisfied in a subsequent iteration: (i) the vehicle is charging, the vehicle is in a propulsion ready state, (iii) the RESS temperature is less than or equal to the new, or second, predetermined temperature threshold, or (iv) the RESS state of charge is less than or equal to the predetermined state of charge threshold. The RESS cooling is preferably terminated via instructions provided by the processor 172 of FIG. 1 to the cooling system 144, 200 of FIGS. 1-3 (for example, by commanding the fan, compressor, and/or heat exchanger to turn off).

Accordingly, the disclosed methods, systems, and vehicles provide for potentially improved cooling of rechargeable energy storage systems (RESS) of vehicles. Cooling of the RESS is provided while the vehicle is not plugged in or charging, and while the vehicle is not a propulsion ready state, provided further that the average RESS cell temperature is greater than a predetermined temperature threshold and the RESS state of charge is greater than a predetermined state of charge threshold.

It will be appreciated that the disclosed methods, systems, and vehicles may vary from those depicted in the Figures and described herein. For example, the vehicle 100, the RESS control system 124, the cooling system 200, and/or various components thereof may vary from that depicted in FIGS. 1-3 and described in connection therewith. In addition, it will be appreciated that certain steps of the process 400 may vary from those depicted in FIG. 4 and/or described above in connection therewith. It will similarly be appreciated that certain steps of the process described above may occur simultaneously or in a different order than that depicted in FIG. 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method of maintaining a rechargeable energy storage system (RESS) of a vehicle, the method comprising:
    determining whether the RES S is charging;
    determining whether the vehicle is in a propulsion ready state; and
    initiating cooling of the RESS if the RESS is not charging and the vehicle is not in the propulsion ready state, provided further that one or more conditions are present that would promote faster than desired capacity loss for the RESS.

2. The method of claim 1, wherein the step of initiating the cooling comprises:
    initiating the cooling of the RESS using a liquid-to-liquid heat exchanger if the RESS is not charging and the vehicle is not in the propulsion ready state, provided further that one or more conditions are present that would promote faster than desired capacity loss for the RESS.

3. The method of claim 1, wherein the step of initiating cooling comprises:
    initiating cooling of the RESS if a temperature of the RESS is greater than a predetermined threshold, provided that the RESS is not charging and the vehicle is not in the propulsion ready state.

4. The method of claim 1, wherein the step of initiating cooling comprises:

initiating cooling of the RESS if a state of charge of the RESS is greater than a predetermined threshold, provided that the RESS is not charging and the vehicle is not in the propulsion ready state.

5. The method of claim 1, wherein the step of initiating cooling comprises:
initiating cooling of the RESS if each of the following conditions are satisfied, namely: a temperature of the RESS is greater than a first predetermined threshold, a state of charge of the RESS is greater than a second predetermined threshold, the RESS is not charging, and the vehicle is not in the propulsion ready state.

6. The method of claim 5, further comprising the steps of:
terminating cooling of the RESS if any of the following conditions are satisfied while the RESS is being cooled, namely: the temperature of the RESS is less than or equal to a third predetermined threshold, the state of charge of the RESS is less than or equal to the second predetermined threshold, the RESS is charging, or the vehicle is in the propulsion ready state.

7. The method of claim 6, wherein the third predetermined threshold of the terminating step is less than the first predetermined threshold of the initiating step.

8. A control system for cooling a rechargeable energy storage system (RESS) of a vehicle, the control system comprising:
a cooling system for cooling the RESS; and
a controller coupled to the cooling system and configured to:
determine whether the RESS is charging;
determine whether the vehicle is in a propulsion ready state; and
initiate cooling of the RESS if the RESS is not charging and the vehicle is not in the propulsion ready state, provided further that one or more conditions are present that would promote faster than desired capacity loss for the RESS.

9. The control system of claim 8, wherein the cooling system comprises a liquid-to-liquid heat exchanger for cooling the RESS.

10. The control system of claim 8, wherein the controller comprises:
a sensor unit configured to obtain data pertaining to a temperature of the RESS, a state of charge of the RESS, or both; and
a processor coupled to the sensor unit and configured to initiate cooling of the RESS based on the temperature of the RESS, the state of charge of the RESS, or both, provided that the RESS is not charging and the vehicle is not in the propulsion ready state.

11. The control system of claim 10, wherein the processor is further configured to initiate cooling of the RESS if the temperature of the RESS is greater than a predetermined threshold, provided that the RESS is not charging and the vehicle is not in the propulsion ready state.

12. The control system of claim 10, wherein the processor is further configured to initiate cooling of the RESS if the state of charge of the RESS is greater than a predetermined threshold, provided that the RESS is not charging and the vehicle is not in the propulsion ready state.

13. The control system of claim 10, wherein the processor is further configured to initiate cooling of the RESS if each of the following conditions are satisfied, namely: the temperature of the RESS is greater than a first predetermined threshold, the state of charge of the RESS is greater than a second predetermined threshold, the RESS is not charging, and the vehicle is not in the propulsion ready state.

14. The control system of claim 13, wherein the processor is further configured to terminate cooling of the RESS if any of the following conditions are satisfied while the RESS is being cooled, namely: the temperature of the RESS is less than or equal to a third predetermined threshold, the state of charge of the RESS is less than or equal to the second predetermined threshold, the RESS is charging, or the vehicle is in the propulsion ready state.

15. A vehicle comprising:
a drive system including a rechargeable energy storage system (RESS); and
a control system coupled to the RESS and configured to cool the RESS, the control system comprising:
a cooling system for cooling the RESS; and
a controller coupled to the cooling system and configured to:
determine whether the RESS is charging;
determine whether the vehicle is in a propulsion ready state; and
initiate cooling of the RESS if the RESS is not charging and the vehicle is not in the propulsion ready state, provided further that one or more conditions are present that would promote faster than desired capacity loss for the RESS.

16. The vehicle of claim 15, wherein the cooling system comprises a liquid-to-liquid heat exchanger for cooling the RESS.

17. The vehicle of claim 15, wherein the controller comprises:
a sensor unit configured to obtain data pertaining to a temperature of the RESS; and
a processor coupled to the sensor unit and configured to initiate cooling of the RESS if the temperature of the RESS is greater than a predetermined threshold, provided that the RESS is not charging and the vehicle is not in the propulsion ready state.

18. The vehicle of claim 15, wherein the controller comprises:
a sensor unit configured to obtain data pertaining to a state of charge of the RESS; and
a processor coupled to the sensor unit and configured to initiate cooling of the RESS if the state of charge of the RESS is greater than a predetermined threshold, provided that the RESS is not charging and the vehicle is not in the propulsion ready state.

19. The vehicle of claim 15, wherein the controller comprises:
a sensor unit configured to obtain data pertaining to a temperature of the RESS and a state of charge of the RESS; and
a processor coupled to the sensor unit and configured to initiate cooling of the RESS if the temperature of the RESS is greater than a first predetermined threshold and the state of charge of the RESS is greater than a second predetermined threshold, provided that the RESS is not charging and the vehicle is not in the propulsion ready state.

20. The control system of claim 19, wherein the processor is further configured to terminate cooling of the RESS if any of the following conditions are satisfied, namely: the temperature of the RESS is less than or equal to a third predetermined threshold, the state of charge of the RESS is less than or equal to the second predetermined threshold, the RESS is charging, or the vehicle is in the propulsion ready state.

* * * * *